United States Patent [19]
Hickerson et al.

[11] Patent Number: 5,950,014
[45] Date of Patent: Sep. 7, 1999

[54] METHODOLOGY FOR PULL MODEL INVOCATION

[75] Inventors: Roger Hickerson; Russell J. Henry, both of Wichita, Kans.

[73] Assignee: LSI Logic Corporation, Milpitas, Calif.

[21] Appl. No.: 08/828,204

[22] Filed: Mar. 21, 1997

[51] Int. Cl.$^6$ .............................. G06F 13/00; G06F 17/00
[52] U.S. Cl. ..................... 395/834; 711/114; 395/200.49; 395/683
[58] Field of Search ....................................... 395/834, 651, 395/200.44, 200.45, 200.46, 200.32, 200.49, 200.61, 680, 683, 182.16, 185.5; 348/7; 711/114

[56] References Cited

U.S. PATENT DOCUMENTS

| | | | |
|---|---|---|---|
| 3,818,461 | 6/1974 | Ward et al. | 340/172.5 |
| 4,125,870 | 11/1978 | Suzuki et al. | 364/900 |
| 4,138,732 | 2/1979 | Suzuki et al. | 364/900 |
| 4,272,819 | 6/1981 | Katsumata et al. | 364/200 |
| 4,571,671 | 2/1986 | Burns et al. | 364/200 |
| 4,783,730 | 11/1988 | Fischer | 364/200 |
| 4,821,185 | 4/1989 | Esposito | 364/200 |
| 4,860,193 | 8/1989 | Bentley et al. | 364/200 |
| 4,956,771 | 9/1990 | Neustaedter | 364/200 |
| 4,958,277 | 9/1990 | Hill et al. | 364/200 |
| 5,003,463 | 3/1991 | Coyle et al. | 364/200 |
| 5,072,420 | 12/1991 | Conley et al. | 395/425 |
| 5,175,818 | 12/1992 | Kunimoto et al. | 395/200 |
| 5,197,128 | 3/1993 | Campbell et al. | 395/275 |
| 5,434,872 | 7/1995 | Peterson et al. | 371/57.1 |
| 5,434,892 | 7/1995 | Dike et al. | 375/377 |
| 5,473,756 | 12/1995 | Traylor | 395/250 |
| 5,517,662 | 5/1996 | Coleman et al. | 395/800 |
| 5,546,546 | 8/1996 | Bell et al. | 395/292 |
| 5,583,995 | 12/1996 | Gardner et al. | 395/200.09 |
| 5,617,537 | 4/1997 | Yamada et al. | 395/200.01 |
| 5,640,565 | 6/1997 | Dickinson | 395/683 |
| 5,764,915 | 6/1998 | Heimsoth et al. | 395/200.57 |
| 5,790,789 | 8/1998 | Suarez | 395/200.32 |

OTHER PUBLICATIONS

Liu, Lok Tin, David E. Culler; Evaluation fo the Intel Paragon on Active Message Communication; Proceedings of Intel Supercomputer Users Group Conference, pp. 1–21.

*Primary Examiner*—Thomas C. Lee
*Assistant Examiner*—Mohamed Mashaal
*Attorney, Agent, or Firm*—Wayne P. Bailey; Alan W. Young

[57] ABSTRACT

A method for dynamic reconfiguration of a message-passing interface from a Push model to a Pull model is disclosed. In the Push model, a host computer device moves data stored in a host local memory to an I/O peripheral shared memory, whereas in the Pull model, the I/O peripheral moves data from the host's shared memory to a local memory of the I/O peripheral. To dynamically reconfigure the message passing interface from the Push to the Pull model, the hosts waits for the I/O peripheral to cycle through power-on/reset, locates the I/O peripheral's inbound and outbound queues in memory, directs the I/O peripheral to clear its outbound queue of messages from previous inbound messages and initializes the allocated message frames as free messages. The host then posts a message to the I/O peripheral inbound queue instructing the I/O peripheral to initialize in the Pull model. The I/O peripheral then posts any messages currently being processed to the I/O peripheral outbound queue. Thereafter, the host posts the allocated free messages to the I/O peripheral inbound queue, and the I/O peripheral makes the free messages available as free messages for the host inbound queue.

20 Claims, 3 Drawing Sheets

METHODOLOGY FOR PULL MODEL INVOCATION

BACKGROUND OF THE INVENTION

1. Field of the Invention

The present invention relates to message passing interfaces between a host and an I/O peripheral device. More specifically, the present invention relates to the dynamic reconfiguration of such a message passing interface.

2. Previous art

A host device often is required to communicate with I/O peripherals. As the demand for I/O throughput increases, so do the demands placed on the host device and the I/O peripherals. Increasing amounts of data must be transferred to and from the host and I/O peripheral, at ever increasing speeds. Various message passing protocols have been developed to facilitate communication between the host and the I/O peripheral, both to facilitate device driver portability across operating systems and to contribute to the development of intelligent, distributed I/O processing. By utilizing a standard message passing interface, device drivers can be designed independent of both the underlying bus architecture and the specific operating system used. Moreover, by imbuing the device driver with added intelligence and autonomy, the burden of the host processor or processors, memory and system bus in controlling interrupt driven I/O tasks can be lessened, thus freeing them for other tasks, such as application processing tasks. A message passing protocol can be thought of as intermediary separating the host and the I/O device which facilitates the exchange of data and control information. A specific implementation of such a message passing protocol includes one inbound and one outbound queue. In such an implementation, the I/O peripheral would provide one inbound and one outbound queue. The inbound logical queue receives all messages targeted for the I/O peripheral, whereas the outbound queue receives all messages processed by the I/O peripheral. Likewise, the host device would provide one inbound and one outbound logical queue. The inbound logical queue receives all messages targeted for the host, whereas the outbound logical queue receives all messages processed by the host. The inbound queue of the host is the outbound queue for the I/O peripheral. Likewise, the outbound queue of the host is the inbound queue of the I/O peripheral.

The host and the I/O peripheral include both local and shared memory. The shared memory of the host is mapped into the system address space, whereas the local memory of the host is accessible only to the host. The host shared memory is accessible both to the host, as well as to other devices, such as the I/O peripheral, having access to shared system memory. The I/O peripheral also includes local memory, accessible only to the I/O peripheral. The I/O peripheral also includes shared memory, which is also mapped into the system address space.

There is often a need to move data from a host system to a local memory of an I/O peripheral. For this purpose, two methods of moving data are known. These are the Push and Pull models of data movement.

The movement of data, in the Push model, is initiated by the host. In the Push model, the host moves data stored in its private local memory to the I/O peripheral's shared memory, which shared memory is mapped into the system address space. Thus, in the Push model, the host "pushes" data located in its private local memory to the I/O peripheral's shared memory. To do this, the I/O peripheral allocates message frames in its own shared memory, which shared memory is mapped into the shared system memory. The host then copies messages from the host local memory to those allocated message frames in the I/O processor shared memory.

Movement of data, in the Pull model, is initiated by the I/O peripheral. In the Pull model, the I/O peripheral moves data from the host's shared memory region, which shared memory is mapped into the system address space, to the I/O peripheral's own private local memory. Thus, in the Pull model, the I/O peripheral "pulls" data located in the host shared memory to its own local memory. To do this, the host allocates message frames in its shared memory, which shared memory is mapped into the shared system address space. The I/O peripheral then copies data from the shared system memory to its private local memory.

There are instances where the Push model of data transfer between the host and the peripheral is preferable, and more efficient. Such might be the case wherein the host processor architecture favors the Pull model or where there are relatively few I/O interrupts that are generated, or where the host requires continuous control over the processing of such interrupts. Other host processor architectures and other situations favor the Pull model, such as when a large number of vectored interrupts are generated, or when sustained data transfers occur between the host and the I/O peripheral. There are other situations still in which both the Push and the Pull model should be utilized consecutively, to make the most efficient use of system resources. In such situations, there has been a long felt need for a method of switching the message passing interface from the Push model of data transfer to the Pull model. Moreover, there has been a long felt need to dynamically reconfigure such a message passing interface from the Push model to the Pull model, without requiring the I/O processor, at first initialized in the Push model, to cycle through power-on/reset and to re-initialize in the Pull model.

SUMMARY OF THE INVENTION

It is an object of this invention, therefore, to provide a method for switching a message passing interface between a host and an I/O peripheral from the Push model in which the host moves data stored in its private local memory to the I/O peripheral's shared memory to the Pull model, in which the I/O peripheral moves data from the hosts shared memory region, to the I/O peripheral's own private local memory.

It is an additional object of this invention to provide such a method for dynamically reconfiguring such a message passing interface from the Push model to the Pull model, without requiring the I/O processor, initially initialized in the Push model, to cycle through power-on/reset and to re-initialize in the Pull model.

In accordance with the above objects and those that will be mentioned and will become apparent below, the method for Pull model invocation accordance with this invention comprises the steps of:

locating an inbound queue and an outbound queue of the I/O peripheral;

clearing the outbound queue of the I/O peripheral of any messages from previous inbound messages;

initializing the I/O peripheral in the Pull model;

posting messages currently being processed by the I/O peripheral to the I/O peripheral outbound queue; and sending messages that will be recognized as free messages to the I/O peripheral inbound queue, whereby the I/O peripheral recognizes that the free messages are not requests from the host, and that the free messages are available for further processing by the I/O peripheral.

According to an exemplary embodiment of the present invention, the host, prior to the locating step, carries out a waiting step to insure that the I/O peripheral has finished cycling through power-on/reset and has initialized in the Push model.

According to another exemplary embodiment of the present invention, the clearing step is initiated by the host, which carries out a step of posting a message on the I/O peripheral's inbound queue, directing the I/O peripheral to flush its outbound queue.

In another embodiment, the host, prior to the sending step, carries out a step of allocating at least one message frame in host memory, the at least one allocated message frame being used to initialize the I/O peripheral's inbound queue.

According to a still further exemplary embodiment of the present invention, the host further carries out a step of initializing each of the at least one allocated message frame as a NULL message, to thereby cause the I/O peripheral to recognize each of the at least one allocated and NULL initialized messages as a free messages.

In another embodiment, the Pull model initializing step is carried out at the request of the host, which further carries out a step of posting a Pull model initialization request message to the I/O peripheral's inbound queue.

It is an advantage of this invention to a provide a method whereby the message passing interface between the host and the I/O peripheral can be dynamically reconfigured from the Push model to the Pull model, without requiring the I/O peripheral to be reset or powered down.

BRIEF DESCRIPTION OF THE DRAWING

For a further understanding of the objects and advantages of the present invention, reference should be had to the following detailed description, taken in conjunction with the accompanying drawing, in which like parts are given like reference numerals and wherein.

DETAILED DESCRIPTION OF THE INVENTION

Figure 1:
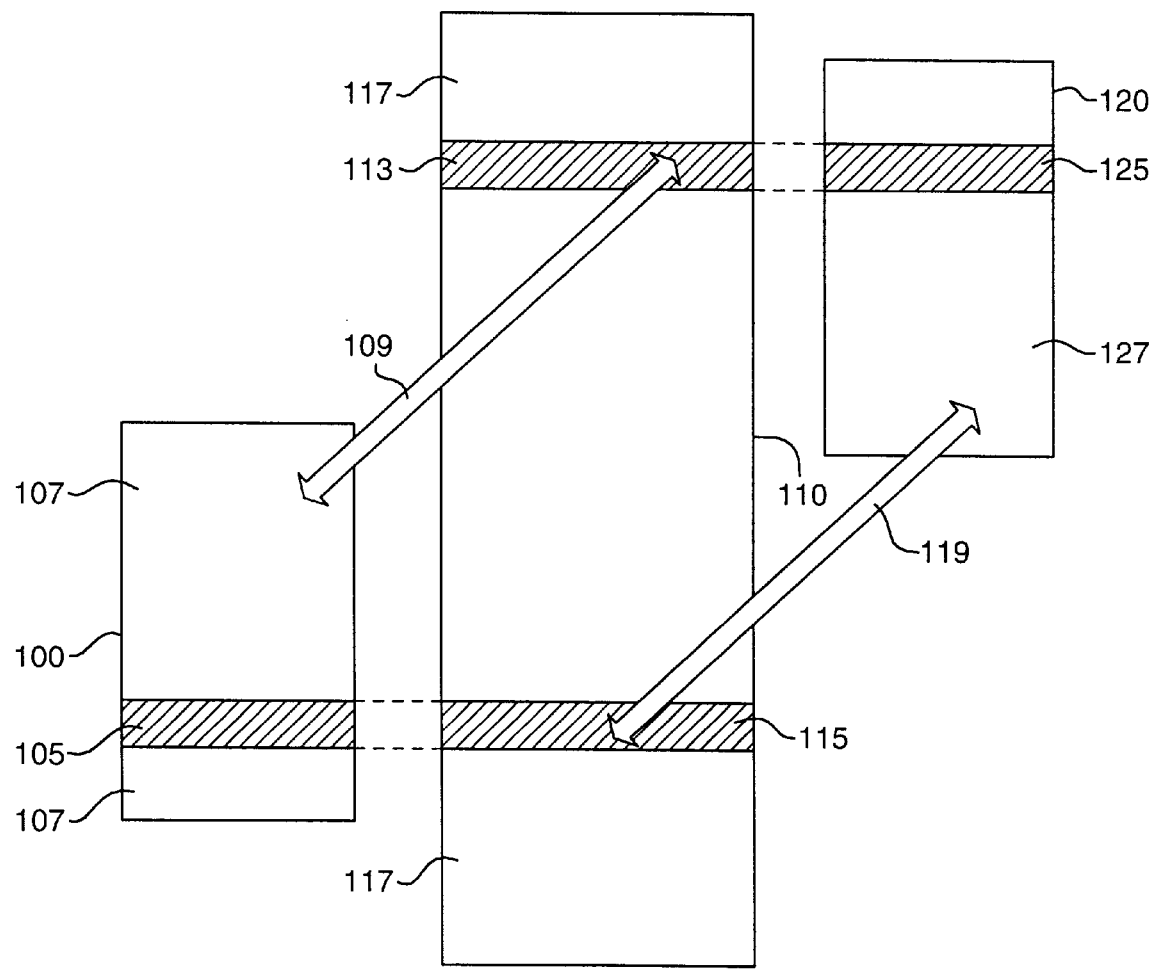
FIG. 1 is a diagram showing the logical configuration of the host and I/O peripheral local and shared memories, and the shared system memory.

Prior to a detailed description of the present invention, the concepts of Push and Pull models will be illustrated with reference to FIG. 1, which illustrates the logical configuration of the host and I/O peripheral local and shared memories, and the shared system memory. In FIG. 1, reference numeral 100 represents the host device, 110 represents the shared system memory, and 120 represents the I/O peripheral. The host 100 has both local private memory 107 and shared memory 105, which shared memory is mapped into a block 115 of the shared system address space 117, as indicated by the dashed lines joining host shared memory 105 and shared system memory block 115. Similarly, the I/O peripheral 120 has local memory 127 which is accessible only to the I/O peripheral, and shared memory 125, which is mapped into a block 113 of the shared system memory 117.

In the Push model, the host moves data is moved from the host's private local memory 107 to the I/O peripheral's shared memory 125, which is mapped into the shared system memory block 113, and thus into the shared system memory address space. The Push model is graphically illustrated in FIG. 1 by the arrow 109, which extends between the host's local memory 107 and the shared system memory block 113.

In the Pull model, the I/O peripheral moves data from the host's shared memory 105, which is mapped to the shared system memory block 115, to the I/O peripheral's local private memory 127. The Pull model is graphically illustrated by arrow 119, which joins the shared system memory block 115 to the I/O peripheral's local memory 127.

Figure 3:
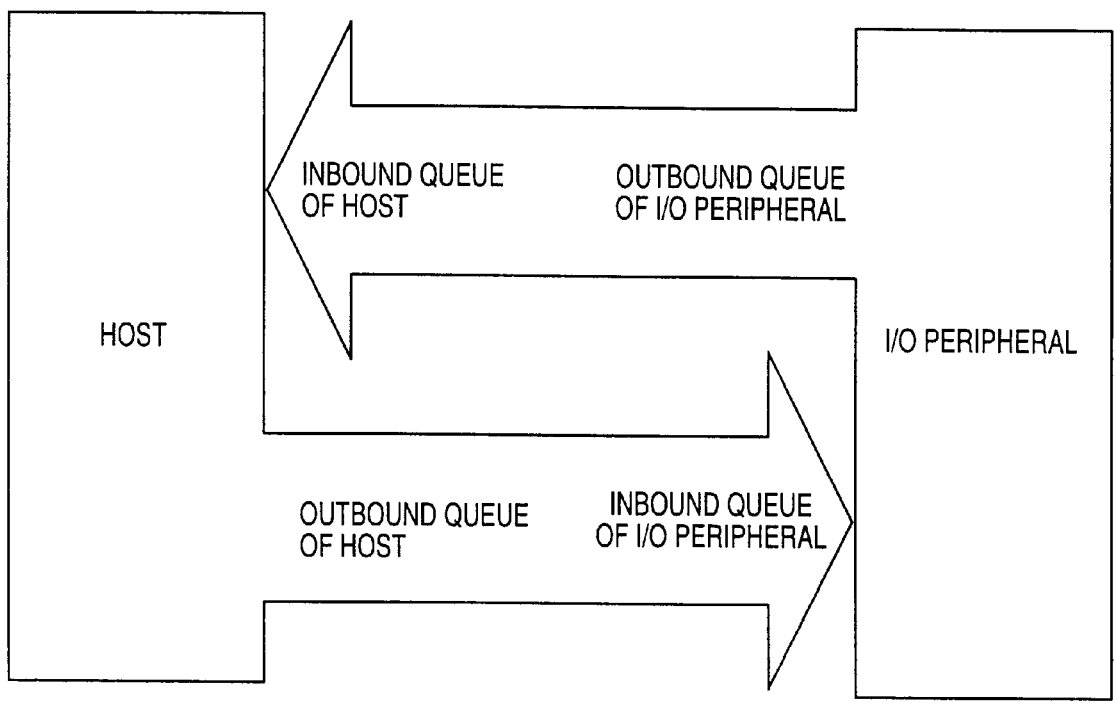
FIG. 3 is a diagram showing the inbound and outbound queues of the host and of the I/O peripheral.

FIG. 3 is a diagram showing the host and the I/O peripheral, and the queues joining them. As shown in FIG. 3, the inbound queue of the host is the outbound queue of the I/O peripheral. Likewise, the outbound queue of the host is the inbound queue of the I/O peripheral.

Figure 2:
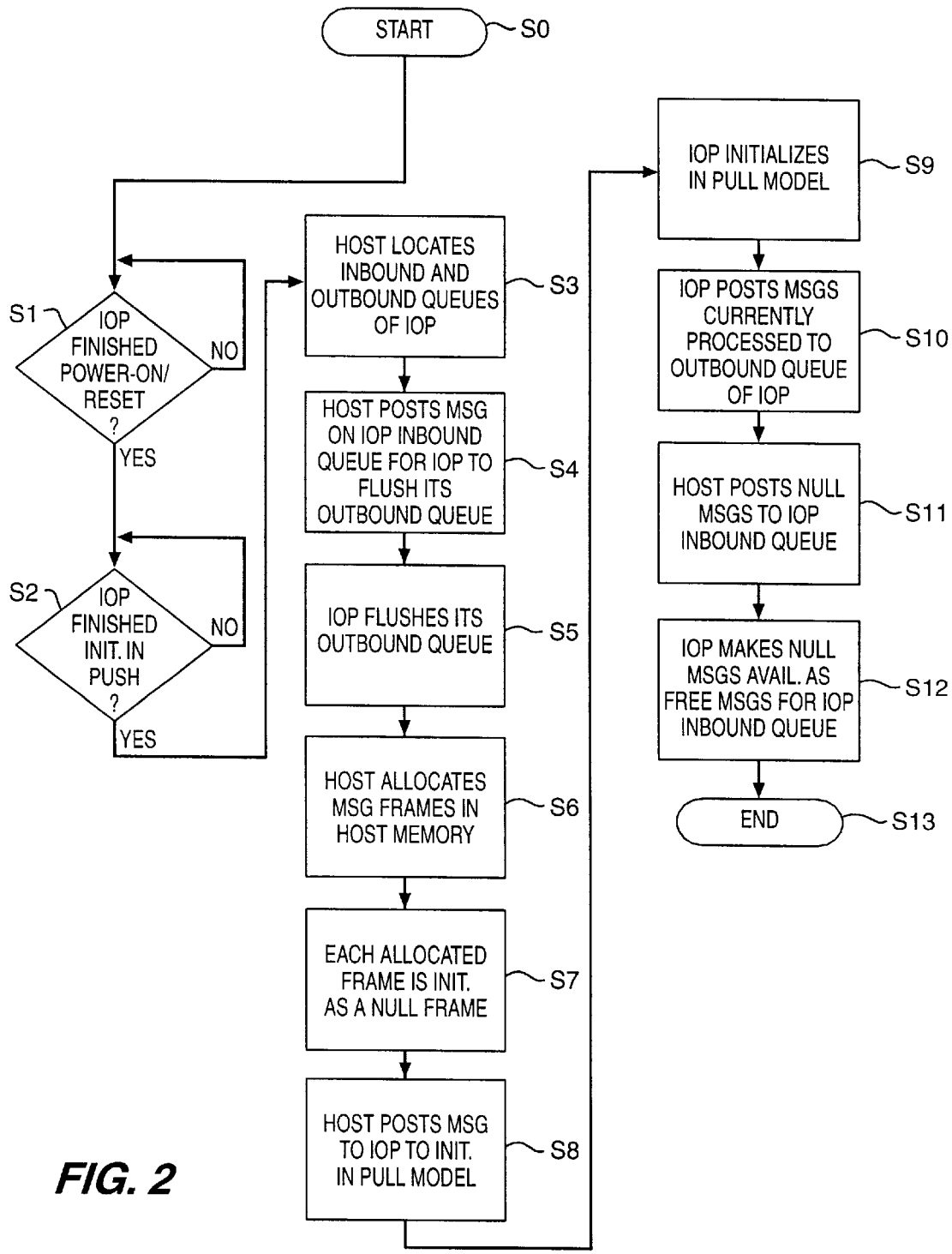
FIG. 2 is a flow chart of the method for Pull model invocation according to the present invention.

The methodology for Pull model invocation according to the present invention is shown in FIG. 2. FIG. 2 is a flow chart detailing the method of invoking the Pull model of data transfer, whereby the I/O peripheral copies data from the host's shared memory, which shared memory is mapped into the shared system memory into its own local memory. The start of the method according to the present invention is indicated in FIG. 2 at 50. In step S1, the hosts waits until the I/O peripheral has cycled through its power-on/reset procedures. If it has not, the host waits until the I/O peripheral has indeed powered on or properly reset. In step S2, the host waits until the I/O peripheral has initialized in the Push model. When the I/O peripheral has indeed properly initialized in the Push model, the host, in step S3, locates the inbound and outbound queues of the I/O peripheral in memory. After they have been located, the host, in step S4, now posts a message on the I/O peripheral inbound queue directing the I/O peripheral to flush its outbound queue, which the I/O peripheral does in step S5. This clears the I/O peripheral outbound queue of any messages from any previous messages. In step S6, the host then allocates message frames in host memory, to be used to initialize the I/O peripheral inbound queue. Each allocated message frame is initialized as a NULL frame in step S7, so that the I/O peripheral will recognize the messages as free messages, and not as requests from the host. The host, in step S8, posts a message to the I/O peripheral inbound queue, instructing the I/O peripheral to initialize in the Pull model. The I/O peripheral then, as directed, initializes in the Pull model in step S9. In step S10, the I/O peripheral posts any messages currently being processed to its outbound queue. The host then posts the allocated and NULL-initialized messages, in step S11, to the I/O peripheral inbound queue. In step S12, the I/O peripheral makes the NULL messages available as free messages for the I/O peripheral inbound queue. The I/O peripheral now has a supply of free messages that will be used to pull data from the system shared memory to its own private local memory. The method ends with step S13.

As can be seen, the methodology for Pull model invocation allows the message passing interface to be dynamically reconfigured, or switched from the Push model to the Pull model. This allows the I/O peripheral to initialize in the Push model after power-on/reset, while providing the host a means to reconfigure the message interface to the Pull model at some later time after power-on/reset. Should it be determined that the Push model would again be more advantageous while the I/O peripheral is initialized in the Pull model, the host may issue an I/O peripheral reset instruction, whereupon the I/O peripheral would then re-initialize in the Push model. Alternatively, the I/O peripheral can be made to cycle, once again, through its power-on/reset procedure, and to initialize in the Push model. Thus, the present invention provides a method for dynamically switching between a Push model of data transfer to a Pull model, but also a method for reverting back to the Push model from the Pull model, should it be advantageous to do so. The ability to dynamically reconfigure the message passing interface, according to the present invention, serves to optimize performance of both the host and the I/O peripheral.

While the foregoing detailed description has described several embodiments of this invention, it is to be understood that the above description is illustrative only and not limiting of the disclosed invention. Those of skill in this art will undoubtedly make various modifications to the present invention, and all such modifications should to be deemed to fall within the spirit of the present invention. Thus, the invention is to be limited only by the claims as set forth below.

What is claimed:

1. A method for dynamically switching between a Push model in which a host computer device moves data stored in a host local memory to an I/O peripheral shared memory, to a Pull model in which the I/O peripheral moves data from a shared memory of the host to a local memory of the I/O peripheral, comprising the steps of:

flushing an outbound queue of the I/O peripheral;

initializing the I/O peripheral in the Pull model;

posting messages currently being processed by the I/O peripheral to the I/O peripheral outbound queue; and sending at least one message to the inbound queue of the I/O peripheral;

whereby the I/O peripheral recognizes the at least one message sent to the inbound queue as a free message available for further processing and not as requests from the host computer device.

2. A dynamic switching method according to claim 1, wherein the host, prior to the flushing step, carries out a step of locating the I/O peripheral's inbound and outbound queues in memory.

3. A dynamic switching method according to claim 1, wherein the flushing step is initiated by the host, which carries out a step of posting a message on the I/O peripheral's inbound queue, directing the I/O peripheral to flush its outbound queue, to clear the outbound queue of all messages from previous inbound messages.

4. A dynamic switching method according to claim 1, wherein the host, prior to the sending step, carries out a step of allocating at least one message frame in host memory, the at least one allocated message frame to be used to initialize the I/O peripheral's inbound queue.

5. A dynamic switching method according to claim 4, wherein the host further carries out a step of initializing each of the at least one allocated message frame as a NULL message.

6. A dynamic switching method according to claim 1, wherein the Pull model initializing step is carried out at the request of the host, which further carries out a step of posting a Pull model initialization request message to the I/O peripheral's inbound queue.

7. A dynamic switching method according to claim 1, wherein the I/O peripheral, upon initializing to the Pull model, further carries out a step of posting any messages currently being processed to the I/O peripheral outbound queue.

8. A method for dynamic reconfiguration of a message-passing interface from a Push model to a Pull model in a computer system comprising at least a host device and an I/O peripheral, comprising the steps of:

locating an inbound queue and an outbound queue of the I/O peripheral in memory;

clearing the outbound queue of the I/O peripheral of any messages from previous inbound messages;

initializing the I/O peripheral in the Pull model;

posting messages currently being processed by the I/O peripheral to the I/O peripheral outbound queue; and posting at least one message that will be recognized as a free message to the I/O peripheral inbound queue;

whereby the I/O peripheral recognizes that the at least one message is not a request from the host, and that the at least one message is available for further processing by the I/O peripheral.

9. A dynamic reconfiguration method according to claim 8, wherein the host, prior to the locating step, carries out a waiting step to insure that the I/O peripheral has finished cycling through power-on/reset and has initialized in the Push model.

10. A dynamic reconfiguration method according to claim 8, wherein the clearing step is initiated by the host, which carries out a step of posting a message on the I/O peripheral's inbound queue, directing the I/O peripheral to flush its outbound queue.

11. A dynamic reconfiguration method according to claim 8, wherein the host, prior to the free message posting step, carries out a step of allocating at least one message frame in host memory, the at least one allocated message frame being used to initialize the I/O peripheral's inbound queue.

12. A dynamic reconfiguration method according to claim 11, wherein the host further carries out a step of initializing each of the at least one allocated message frame as a NULL message, to thereby cause the I/O peripheral to recognize each of the at least one allocated and NULL initialized messages as a free message.

13. A dynamic reconfiguration method according to claim 8, wherein the Pull model initializing step is carried out at the request of the host, which further carries out a step of posting a Pull model initialization request message to the I/O peripheral's inbound queue.

14. A method for Pull model invocation, comprising the steps of:

locating an inbound queue and an outbound queue of an I/O peripheral in memory;

directing the I/O peripheral to clear its outbound queue of messages from previous inbound messages;

posting a message to the I/O peripheral inbound queue instructing the I/O peripheral to initialize in the Pull model;

posting messages currently being processed by the I/O peripheral to the I/O peripheral outbound queue; and posting at least one message to the I/O peripheral inbound queue;

whereby, starting from a Push model in which a host computer device moves data in a host local memory to an I/O peripheral shared memory, the Pull model is dynamically invoked, in which the I/O peripheral moves data from the host's shared memory to a local memory of the I/O peripheral.

15. The Pull model invocation method of claim 14, wherein the I/O peripheral further carries out the step of making the at least one message available as a free message, and not as a request for further processing by the host.

16. The Pull model invocation method of claim 14, wherein the host, prior to the locating step, carries out a waiting step to insure that the I/O peripheral has finished cycling through power-on/reset and has initialized in the Push model.

17. The Pull model invocation method of claim 14, wherein the directing step is initiated by the host, which carries out a step of posting a message to the inbound queue of the I/O peripheral, which message directs the I/O peripheral to flush its outbound queue.

18. The Pull model invocation method of claim 14, wherein the host, before the at least one message posting step, carries out a step of allocating at least one message frame in host memory, the at least one allocated message frame being used to initialize the I/O peripheral's inbound queue.

19. The Pull model invocation method of claim 18, wherein the host further carries out a step of initializing each of the at least one allocated message frames as a NULL message, to thereby cause the I/O peripheral to recognize each of the at least one allocated and NULL initialized messages as a free message, and not as a request.

20. The Pull model invocation method of claim 14, wherein the message instructing the I/O peripheral to initialize in the Pull model is posted by the host.

* * * * *